Nov. 22, 1938.  E. W. AUSTIN  2,137,829
EARTH MOVING DEVICE
Filed Sept. 1, 1934  4 Sheets-Sheet 1
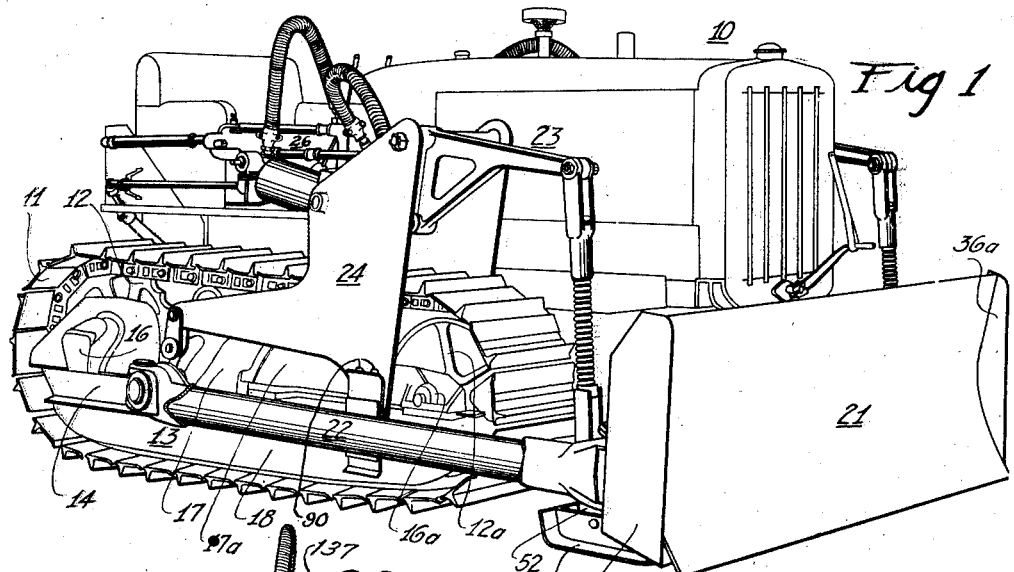
INVENTOR
ELLSWORTH W AUSTIN
BY Flournoy Corey
ATTORNEY

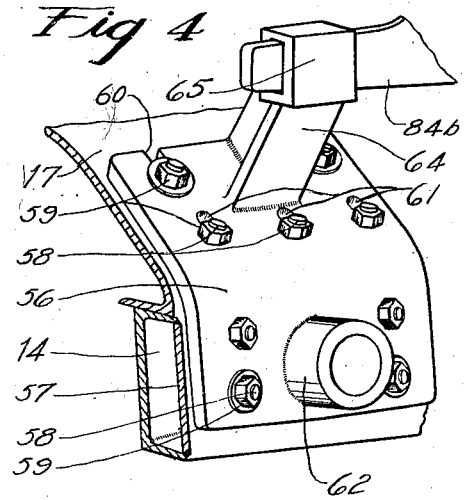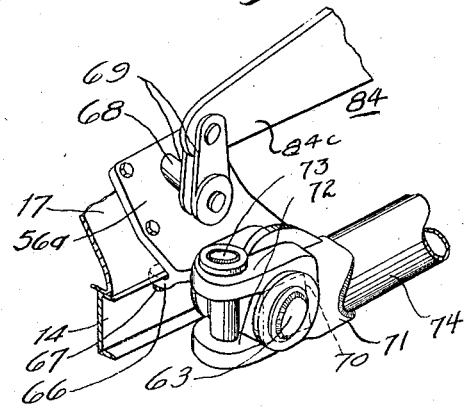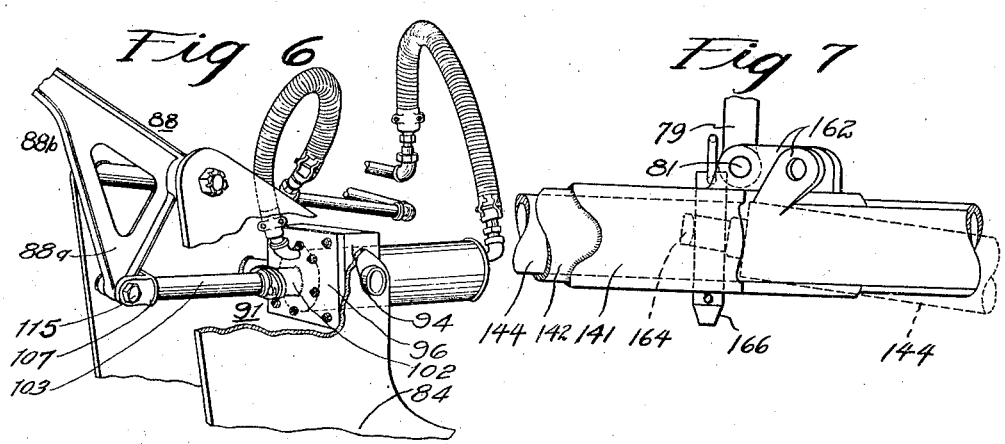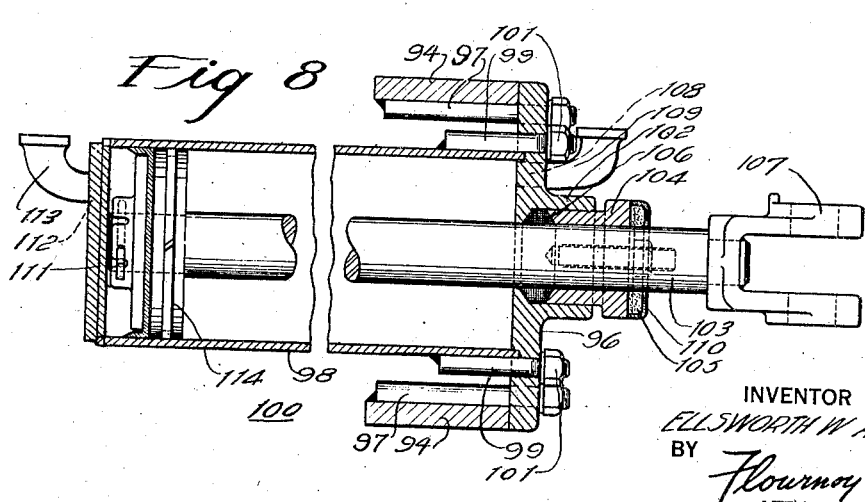

Nov. 22, 1938.  E. W. AUSTIN  2,137,829
EARTH MOVING DEVICE
Filed Sept. 1, 1934  4 Sheets-Sheet 3
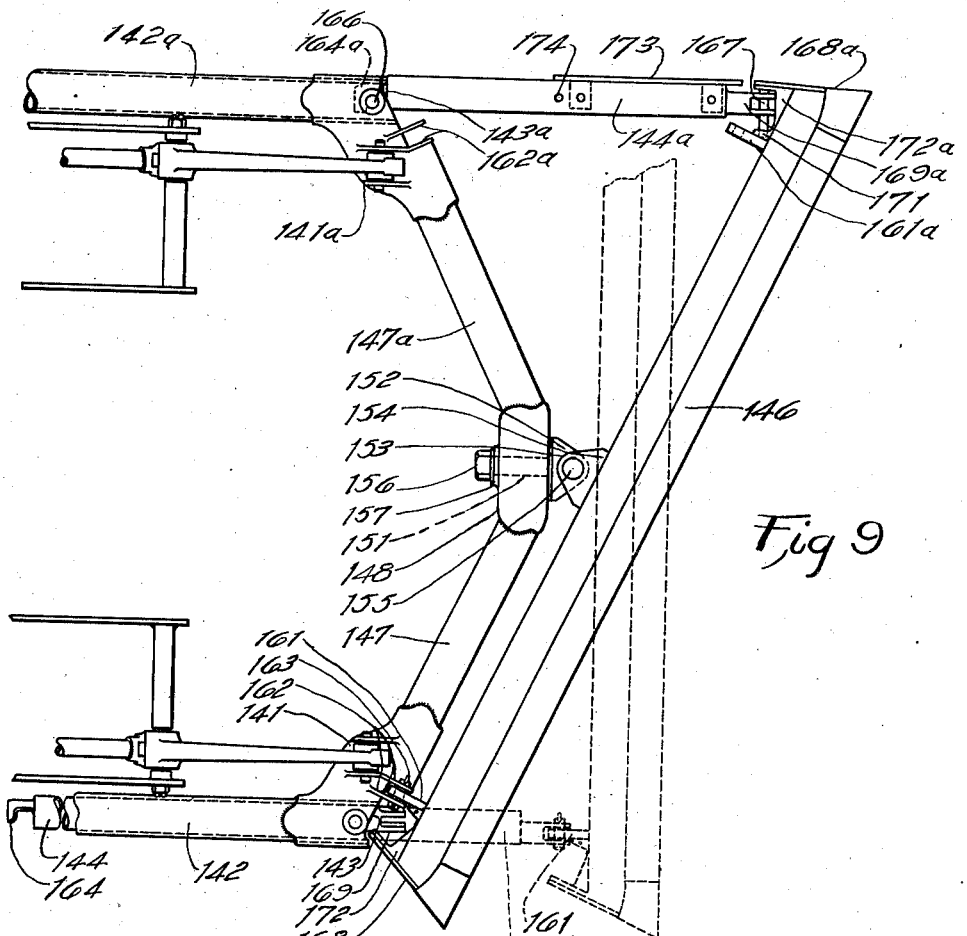
Fig 9
Fig 10
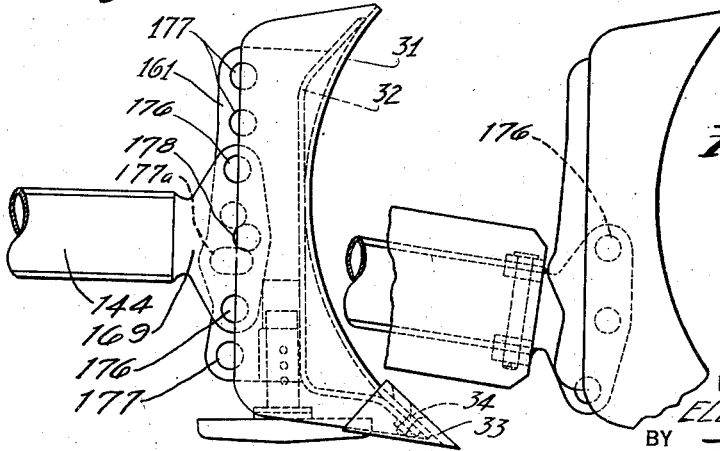
Fig 11
INVENTOR
ELLSWORTH W. AUSTIN
BY Flournoy Corey
ATTORNEY

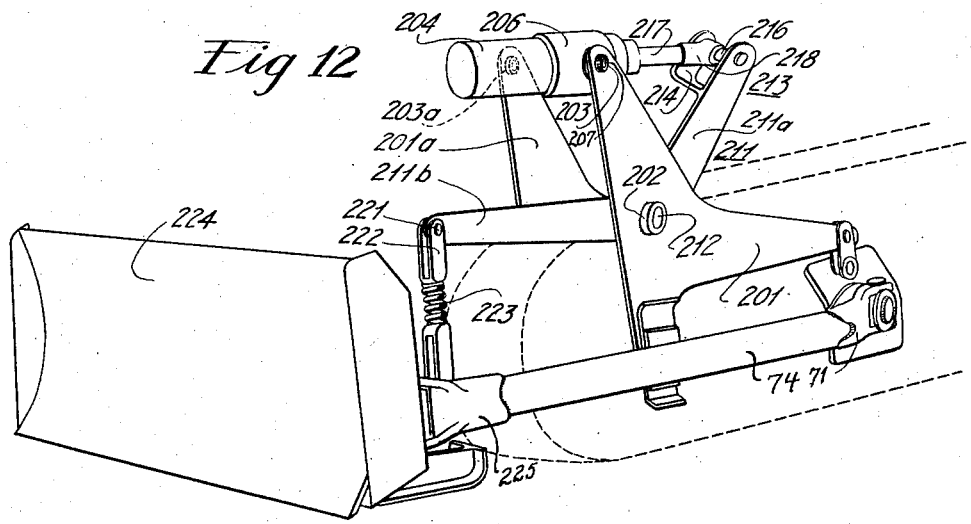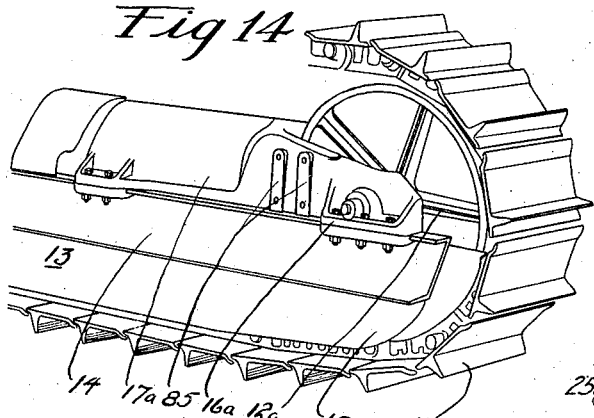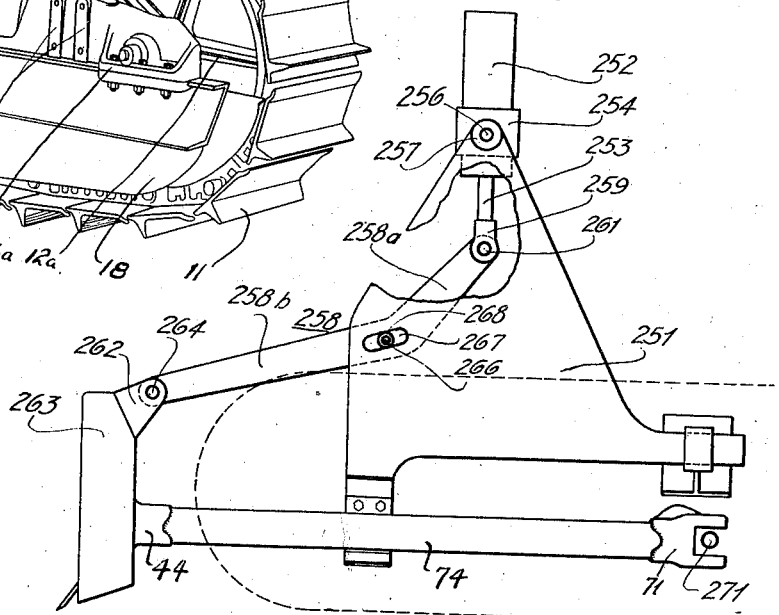

Patented Nov. 22, 1938

2,137,829

UNITED STATES PATENT OFFICE 2,137,829

EARTH MOVING DEVICE

Ellsworth W. Austin, Cedar Rapids, Iowa, assignor to La Plant-Choate Manufacturing Company, Incorporated, Cedar Rapids, Iowa, a corporation of Delaware Application September 1, 1934, Serial No. 742,368

12 Claims. (Cl. 37—144)

My invention relates to earth moving devices and has particular relation to a means for adjustably securing a scraper blade, a plow, or the like to a tractor, a wagon, or other prime mover and for operating and actuating the blade.

It is a common expedient to mount a scraper blade, a plow blade or the like on a framework which is pivotally attached to a tractor with the blade in front of the tractor and to actuate the blade by power means associated with the tractor. I have observed that such supporting and actuating mechanism are not always satisfactory for the reason that part of the actuating mechanism is mounted on the tractor itself and the reactive forces set up by the hydraulic jack or other power means causes tilting of the tractor on its supporting springs, which action is objectionable and which may even lead to broken springs and other injuries to the tractor and other parts. I have observed also that when one of the running gears of the tractor passes over an obstruction the blade is jerked into the air. The actuating mechanisms were frequently located at disadvantageous positions as regards loading leverages and minimum interference with operation. Furthermore the structures are complicated and expensive to construct and maintain. I have observed also that the blade mountings are not always satisfactory for the reason that the blade is not readily adjustable to vary the depth and angle of cut and to throw the material to one side or the other as desired. The devices of the prior art have been found to vary the depth and angle of cut under load.

I have therefore devised a new and improved blade supporting and actuating mechanism which overcomes the difficulties above enumerated, which is extremely simple in construction and operation, and which is entirely supported on the sub-frames of the tractor where it cannot disturb the equilibrium of the tractor itself. I have devised means for mounting the actuating mechanism well forward on the tractor sub-frames where it is out of the way and where it can exert proper leverage without undue loading or disturbance.

I have also devised a new and improved mounting for scraper blades and the like, which permits adjustment of the blade at several angles of incidence with respect to the ground, which permits adjustment of the blade to throw the material to the right or the left as desired, and which permits tilting of the blade from side to side in all positions of the blade. The construction of the blade-attaching means is simple and sturdy, and the position of the blade will not vary under load.

Some of the general objects of my invention are to provide a new and improved means for attaching a scraper blade, a plow, or the like to a tractor or other prime mover, and to provide a new supporting, operating, and actuating means for controlling the movements of the blade or plow.

An object of my invention is to provide a blade supporting and actuating mechanism which is mounted on the sub-frame of the tractor where the forces set up will not materially disturb the equilibrium of the tractor.

Another object of my invention is to provide an attaching means for attaching a scraper blade or the like to a tractor to permit adjustment of the blade to vary the angle of incidence with regard to the ground, to permit tilting of the blade, and to permit the blade to be swung about a vertical axis to throw material to the right or left as desired.

Another object of my invention is to provide means for mounting the actuating means well forward on the sub-frames of the tractor and to provide mounting means which permit movement of the parts of the tractor running gear.

Another object of my invention is to provide means for mounting the plow actuating means on moving parts of the tractor sub-frames, since this location furnishes a convenient forward location and permits transmission of the various stresses directly to the track.

Another object of my invention is to provide means for compensating for unequal vertical movement of the running gears of the tractor.

Another object of my invention is to provide operating and attaching means of the above description which are simple and rugged in construction and reliable and steady in operation.

Other and further features and objects of my invention will be more apparent to those skilled in the art upon a consideration of the accompanying drawings and following specification, wherein is disclosed several exemplary embodiments of the invention, with the understanding, however, that such changes may be made therein as fall within the scope of the appended claims without departing from the spirit of the invention. The device may be used or adapted for use for other purposes.

In said drawings:

Figure 1 is a front quartering view in perspective showing a plow blade and plow blade actuating means constructed according to one embodiment of my invention as they appear when attached to a tractor.

Figure 2 is a rear quartering view in perspective of the plow supporting and actuating mechanism shown in Figure 1 as it appears when removed from the tractor.

Figure 3 is a detailed view in perspective of one end of the plow or scraper blade showing the means for attaching one of the side frames to one end of the scraper blade and for attaching one of the actuating levers to one end of the blade.

Figure 4 is a detail view in perspective of a modified form of the means whereby a portion of the plow actuating mechanism supports are mounted on the tractor.

Figure 5 is a view in perspective showing the means illustrated in Figure 1 whereby the plow actuating mechanism supports and the ends of the side frames are mounted on the tractor subframes.

Figure 6 is a view in perspective showing how the hydraulic jacks and portions of the plow actuating levers are mounted on the plow actuating means supports.

Figure 7 is a view in perspective showing the parts of an adjustable push pole constructed according to one embodiment of my invention.

Figure 8 is a view partly in section and partly in elevation of the hydraulic jack and its mounting. These parts are also shown in Figures 1, 2, and 6.

Figure 9 is a plan view showing how the plow blade is attached to the front end of the plow supporting structure and how the plow actuating mechanism is engaged with the plow supporting structure.

Figure 10 is a view in side elevation illustrating how the end of the plow blade is secured to the end of the push pole when the blade is in the "bulldozing" position.

Figure 11 is a view in side elevation showing how the outer end of the plow blade is secured to the end of the push pole when the blade is in the "trailbuilding" position.

Figure 12 is a view in perspective showing a modified form of actuating mechanism and its supporting structure.

Figure 13 is a view in perspective of still another modified form of actuating mechanism and supporting structure, and Figure 14 is a partial view in perspective showing a sub-frame and the fixed and movable portions of the sub-frame covers.

Referring now to the drawings and more particularly to Figures 1, 2, 9, and 14 thereof, there is shown at 10 generally a tractor of the usual type employing a pair of crawler treads 11, one on each side of the tractor, which rotate on sprocket wheels 12 and 12a, the wheels 12 being driven by the motor of the tractor in accordance with the usual practice. The wheels 12 and 12a are mounted on sub-frames 13 in accordance with the usual practice. The sub-frames 13 include channels 14 on which wheel bearings 16 and 16a are mounted, and sloping reinforcing or cover members 17 and 17a, which are mounted on top of the channels 14. The cover members 17a and their wheels 12a and wheel bearings 16a are slidable longitudinally on the beams 14 and covers 17 to permit rocks and the like to pass between the sprocket wheels and the treads and to take up slack in the treads. Track roller guards 18 depend from the channels 14 all in accordance with the usual practice.

For the purpose of facilitating a description of the device I have arbitrarily divided the parts of the structure here shown as illustrating my invention into five groups. The groups may be said to comprise the plow 21, the plow supporting structure 22, the plow actuating mechanism 23, which also assists in supporting the plow and plow supporting mechanism, the plow actuating means supporting structure 24 and the hydraulic actuating mechanism and system 26. There are several modifications of the plow supporting structure and of the plow actuating structures shown in the drawings and hereinafter described. The first plow supporting structure is shown more particularly in Figures 1, 2, and 3 and this plow supporting structure affords a substantially rigid connection between the plow and plow supporting structure, which is adapted to hold the plow blade in a right angled "bulldozing" position in front of the tractor. The plow blade may be raised and lowered by the actuating mechanism but is not, in this embodiment of the invention, adapted for movement from the "bulldozing" position. In a modified form of the plow supporting mechanism shown more particularly in Figures 7, 9, and 10 the plow blade is adapted to be maintained in two "trailbuilding" positions to discharge material to the right or the left as desired, or in the right angled "bulldozing" position. In Figures 12 and 13 modified forms of the actuating mechanism are shown. The blade may be tilted forward and back as desired and may be tilted about its transverse axis while in any one of the "trailbuilding" or "bulldozing" positions so that one side is lower than the other as for use in "crowning" a road or the like.

The plow or scraper blade 21 is of "built-up" construction and is comprised of a curved front plate 31 so shaped, in accordance with the usual practice, as to roll the dirt over and over upon itself, and a rear plate 32, rough of shallow U-shape, which affords bracing for the front plate. The plates 31 and 32 are joined by a cutting edge or shoe 33 of abrasive resistant steel. This cutting edge is secured to the plates 31 and 32 in any suitable manner as by means of bolts 34. The plates 31 and 32 are braced at the ends by means of end plates 36 and 36a and these plates are, of course, disposed at right angles with regard to the planes of the plates. A pair of heavy brackets 37 are welded or otherwise secured to the rear face of the plate 32 at opposite ends thereof. The structures I am about to describe are, of course, in duplicate, one on each side of the plow, except that they are complementary to each other.

The brackets 37 are comprised of pairs of rearwardly and horizontally extending plates 38 and 39 braced by gussets 41. A plurality of openings 42 and 43 are provided in the plates 38 and 39 in order that side frame front end castings 44 may be secured to the brackets 37 as by means of pins 46. Shoes 51, in the general form of runners are secured to suitable downwardly and rearwardly projecting flanges 52 on the lower side of the plates 39, as by means of bolts 53 which pass through pairs of upwardly projecting flanges 54 on the runners or shoes and through the downwardly and rearwardly projecting flanges on the plate 39. Two pairs of openings 55 are provided in each of the upwardly projecting flanges 54 of the shoes in order that the shoes may be secured in either one of two positions, that is a lowered position so as to raise the blade above the ground, and a raised position so as to permit it to approach closer to the ground.

The plow blade supporting structures 22 include pivot bearing plates 56 which are bent at slight angles so that the lower part of the plates may engage the beams 14 of the sub-frames of the tractor and the upper portions may engage the sloping cover plates 17 which are located above the beams 14. The pivot bearing plates 56 may take the form shown in Figure 4, in which the plate is adapted to engage pads or plates 57, which in turn are engaged to the beams 14 and may be bolted in place by the bolts 58 and nuts 59 shown, or may be secured in any desired manner. The pivot bearing plates 56, shown in Figure 4, are provided with notches 60 at their upper edges and slots 61 in the upper portion of the plates to facilitate engagement of the plates on the covers 17. In this form of the device bosses 62 are provided at the lower vertically extending portions of the plates 56 and these bosses are adapted to receive stub shafts such as the shafts 63, shown in Figure 5.

In the form of plates shown in Figure 4 the upper slanting portions of the plates are provided with upwardly and outwardly projecting brackets 64 and the end of the brackets 64 are formed with sleeves or "muffs" 65 adapted to receive rearwardly projecting portions 84b of the supporting plates of the blade actuating supporting members 84. These portions of the device will be hereinafter more particularly described.

In the form of the device shown in Figure 5 the pads or plates 57 are dispensed with and the plates 56a are provided with inwardly projecting flanges 66 which are adapted to engage upwardly and outwardly extending portions or flanges of the beams 14. The flanges 66 are adapted to be secured to the beams 14, as by means of set screws 67. Of course the flanges 66 may be so formed as to engage any other part of the beams. The plates 56a are provided with bosses corresponding to the bosses 62, which are adapted to receive the stub shafts 63. The upper portions of the plates 56a are the same as the plates 56 shown in Figure 4 except that instead of the brackets 64 short horizontally and outwardly extending stub shafts 68 are provided in the upper portion of the plates. The stub shafts 68 are adapted to receive pairs of links 69 which constitute clevislike members adapted to receive rearwardly extending portions of the plow actuating mechanism support devices 84, as hereinafter more particularly described.

Somewhat similar plates 56b are provided for the inner downwardly sloping portions of the covers 17 and these plates 56b are fastened to the covers 17 in any suitable manner. The plates 56b are provided with inwardly and horizontally extending bosses adapted to receive short horizontally and inwardly extending stub shafts upon which another pair of links 69b are received. These plates, of course, are complementary to the plates 56a and are likewise adapted to receive rearwardly extending portions 84c of the plow actuating means supporting structures.

The plow blade supporting structures 22 include pairs of side frames mounted one on each side of the tractor. Each of these side frames include brackets 71. These brackets have pairs of rearwardly extending ears 72 and the brackets are so formed between these ears as to receive box-like bearings 70 which in turn receive the stub shafts 63. The bearings are locked in place by means of pins 73 which pass downwardly through suitable openings in the ears 72. The front ends of the brackets 71 are cored to receive long cylindrical members or tubes 74 which constitute the main portions of the side frames. These portions 74 of the side frames are preferably made of heavy seamless tubing, but of course can be manufactured of any suitable material and in any suitable form. The brackets 71 are preferably offset or cranked between the ears 72 and the cored portions 76 so that in one position of brackets 71 the central axes of the tubes 74 are slightly below the axes of the stub shafts 63, and in a 180° reversed position of the brackets the central axes of the tubes 74 are above the central axes of the stub shafts 63. In this manner the center of the lines of force or thrust of the side frames against the shafts 63 may be disposed above or below the shafts as desired in accordance with the character of the material being moved by the device and according to whether it is desired to give more or less tilt to the plow blade about its longitudinal axis. In this way the angle of incidence of the blade with the ground may be varied.

The brackets 44 at the front ends of the tubes 74 have already been mentioned. These front side frame brackets 44 are provided with pairs of forwardly and horizontally extending ears 75 provided with suitable openings therein adapted to receive the pins 46 and to be received between the flanges 38 and 39 of brackets 37. Rearwardly extending arms 77 afford, with bosses 78 on the inner sides of the brackets 44, a means of attachment of clevises 79 which form a part of the actuating mechanisms 23. The clevises 79 are secured to the bosses 78 and to suitable enlarged portions at the outer end of the arms 77 by means of pins 81. The brackets 44, of course, are provided with suitable cupped or cored members 82 in the rear thereof to receive the front ends of the tubes 74.

Pairs of rub irons 83 are provided on the inner sides of the tubes 74 at points intermediate their lengths and these rub irons are adapted to bear against the outer faces of the plates 84 which constitute portions of the plow actuating means supporting structures. The side plates 84 are secured to covers 17a by means of bolts 90 or the like which engage the plates to pads 85. The rub irons therefore afford, with the side plates 84, a means for meeting the side thrusts set up in the plow blade supporting structure.

It is apparent that the plow blade structure 21 is rigidly attached to the front ends of the side frames of the plow blade supporting structure 22, on either side of the tractor and that the side frames are in turn pivotally engaged to the subframes of the tractor on either side thereof so that the plow blade may be pivoted about on the stub shafts 63 for up and down movement. The mechanism for securing this up and down movement will now be described.

The actuating means supporting structure 24 preferably includes two pairs of complementary plates 84 placed with a pair on either side of the tractor and with the two plates of each pair placed one on either side of the respective treads 11, with one set of plates engaged on the outer sub-frame beams 14 and another pair placed on the inner sub-frame beams which are complementary to the beams 14 shown.

The plates 84 are roughly triangular in shape with the apex of the triangle fastened to the outer faces of castings 17a by means of downwardly projecting portions 84a of the plates 84.

These downwardly projecting portions are bolted to pads 85 which are secured in place on castings 17a, which castings are longitudinally slidable on beams 14. The castings 17a are made slidable longitudinally, in accordance with the usual practice, in order that rocks and the like which may become caught between the sprockets and the treads may pass between these parts and in order that wear in the treads may be compensated for. The structure is best illustrated in Figure 14. Some types of tractors are not equipped with parts of this character and in this case the plates 84 are fastened directly to the sub-frames.

The uppermost corners of the plates are joined by means of rods 86 held in place by nuts 87. Angle levers or bell cranks 88 are pivotally journaled upon the rods 86 and the plates are spaced apart by sleeves 89 which are preferably welded at their ends to the plates. Intermediate portions of the upper edges of the plates 84 are spaced apart by means of box-like structures or cradles 91, and these box-like structures have short laterally-extending stub shafts or trunnions 92 which are pivotally engaged within suitable bosses 93 on the outer faces of the pairs of plates 84. Rearwardly projecting portions of the plates 84, which may be termed torque arms, are pivotally engaged to the links 69 and 69b as illustrated in Figures 1, 2, and more particularly in Figure 5. In a preferred embodiment of the invention the rearwardly extending portions 84b of the plate 84 terminate in rods or torque arms of substantially rectangular cross-section which are adapted to be received within the "muffs" 65 and which may slide back and forth within the "muffs". These structures are best illustrated in Figure 4. It may readily be understood that if the torque arms 84c of the plates 84 are connected to the plates 56 by means of links, the torque arms will pivot about in arcs the approximate centers of which are the axes of the shafts 68, while if they are engaged by the "muff" structures 65 they will move in substantially straight lines. It is of advantage that the torque arms move in straight lines so as to interfere as little as possible with movement of the castings 17a, but there is sufficient play between the castings 17a and beams 14 to permit the torque arms to move in arcs.

The plates 84 may be considered as bell cranks or levers which, by reason of the play between the movable and fixed parts of the sub-frames, pivot about on the connection between these parts. The torque arms 84c or 84b constitute one set of bell crank arms while the upper portions of the plates 84, to which the jacks and bell cranks 88 are fastened, constitute the other set of arms. The torque arms 84c or 84b may be considered as links or levers connecting the movable front and fixed rear portions of the sub-frames of the tractor and these links move relative to the main part of the track sub-frames. This analysis of the structure will become more apparent in consideration of Figures 12 and 13 which are hereinafter discussed.

There is very little movement of the torque arms of the plates 84 with reference to the plates 56 but a certain amount of movement does exist and preferably is met in one manner or another as described.

The box-like structures 91 consist of a rectangular member 94 which forms four sides, that is, top and bottom and two ends, of the structure. One open side of the cradles 91 is adapted to be closed by means of plates or cylinder heads 96. Bolts 97 are welded to the inner faces of the box-like members 94 and project through suitable openings in the plates 96. The plates 96 themselves form the heads for closing one end of the cylinders 98 of the hydraulic jacks (Figure 8) and the cylinders 98 have a plurality of bolts 99 welded to the outer faces thereof at one end of each of the cylinders. These bolts project through suitable openings in the plates 96 and the plates are secured on the ends of the cylinders 98 by means of nuts 101. The plates 96 are provided with centrally-located bosses 102 and are drilled to receive the shafts 103 of the hydraulic jacks 100 and 100a. Suitable packing glands 104 together with the usual packing material 106 are employed to seal the openings through the plates 96. I preferably provide a dust wiper for the shafts 103 comprising felt or like material 105 encircling the shafts and held in place by the cup-like caps 110. The dust wipers are preferably mounted on the packing glands 104. The shafts 103 are provided with clevises 107 at the free ends thereof. The plates or heads 96 are provided with openings 108 therethrough and these openings are threaded to receive pipe connections 109. The opposite heads 111 are also provided with suitable openings 112 therethrough and the walls of these openings are threaded to receive second angled pipe connections 113. When oil or other fluid under pressure is admitted to the cylinders 98 through the pipe connections 113 the pistons 114 are of course driven to the other ends of the cylinders, the oil on the other side of the pistons 114 being allowed to flow out through the pipe connections 109. Conversely, if the pipe connections 113 are open to permit oil to flow from the cylinders and oil under pressure is conducted into the cylinder through the connections 109 the pistons will move back to their original positions.

It is to be observed that, by reason of the front end bearing of the cradles 91 in the plates 84, the hydraulic jacks may swivel about on the stub shafts 92. The clevises 107 are connected, as by means of pins 115, to one arm 88a of the bell cranks 88. The other arms 88b of the bell cranks 88 are connected by means of pins 116 to long clevises 117. These clevises 117 are provided with cylindrical portions 118 adapted to receive rods 119. These rods 119 are provided with non-removable heads 121 which are located within the arms of the clevises and which prevent the rods 119 from being pulled out of the clevises. The rods 119 may move upwardly in the cylindrical portions 118 of clevises 117 and the heads 121 move upwardly between the arms 117 so that the overall length of the entire connecting links may be shortened. Springs 122 are disposed on the rods 119 and bear against the ends of the cylindrical portions 118 of clevises 117 and against a clevis 79 on the lower end of rod 119. The springs 122 serve to absorb shock imparted to the connecting links by upward movement of the plow blade, as for instance in striking a stone. The rod clevis 79 is secured to the bracket 44 by means of the arms 77, bosses 78 and pins 81, as previously described.

Of course the hydraulic jack and hydraulic jack structure is duplicated on the other side of the tractor. It is apparent that when fluid is introduced to the rear of the hydraulic jacks 100 and 100a through the couplings 113, that the shafts 103 will be forced outwardly to rotate the bell cranks 88, by pushing the crank arms 88a forwardly, to thus raise the arms 88b, which in turn pull upwardly on the links 120 to raise the plow blade. If fluid under pressure is introduced into the hydraulic jacks through the pipe conduits 109 and the fluid is permitted to flow out of the cylinder at the other or rear end through the conduits 113 the plow blade will be lowered.

The supply of fluid for operating the hydraulic jack is preferably carried in a supply tank 123 located at the rear of the tractor and the fluid is conducted to a hydraulic pump (not shown) at the rear of the tractor near tank 123 in accordance with the usual practice and the fluid from the pump under pressure is conducted by means of conduits 124 and 126 to a control valve 127. The pump may be rotated by any suitable connection with the motor of the tractor and the flow of fluid to and from the hydraulic jack 100 is controlled by means of the hydraulic valve located at 127 where it is accessible to the operator. Any suitable valve structure may be employed which will direct fluid selectively to one or the other ends of the hydraulic jacks and will cause the fluid from the jacks and from the pump to flow back into the tank 123 when desired.

In the embodiment of the invention here shown the fluid from the pump may be selectively directed into either the conduit 128 or the conduit 129. Part of the fluid flowing into the conduit 128 is directed by means of the pipe and hose connections 131 to the conduit 113 and into jack 100. The remaining fluid discharged into the pipe 128 is conducted by the pipe 132 to the pipe and hose connections 133 by conduits 132 and from the hose connections 133 into the conduit 113 and into the hydraulic jack 100a. It is to be observed that the conduits 131 and 133 are connected at all times by the conduit 132 and that in this manner the rear portions of the hydraulic jacks 100 and 100a are always connected to thereby equalize the pressure in the jacks 100 and 100a.

When fluid is discharged from the pump into the conduit 129 a part of the fluid is conducted to the front end of the jack 100 by means of the conduit 134 and the remaining part of the fluid is conducted to the jack 100a by means of the conduit 136 and pipe and hose connections 137.

The construction and operation of the valve 127 is such that when fluid is being discharged from the pump into the conduit 128 the conduit 129 is connected with a relief or discharge conduit 138 which leads back to the supply tank 123, thereby permitting the pistons in jacks 100 and 100a to move forward. When the valve 127 is moved to another position fluid is discharged into the conduit 129 and is conducted to the front ends of jacks 100 and 100a. The valve is so constructed that when the valve is in this latter position fluid in the rear ends of the jacks 100 and 100a may be discharged through the conduit 128, through the control valve, and through the discharge conduit 138 to tank 123. The valve is constructed in such a manner that when fluid is not discharged into conduits 128 or 129, or when there is an excess pressure against the systems and the hydraulic jacks, fluid may be led back into the supply tank 123 by conduit 138. The valve is also preferably constructed in such a manner that the ports leading to the hydraulic jacks may be closed off so that the hydraulic jacks are locked in position to lock the plow blade in position. A valve structure for the purpose outlined is more particularly described in Patent No. 1,974,657 to Waldo E. Rodler. Even when the hydraulic jacks are locked the plow blade 21 may move upwardly against the spring 122, as for instance when the blade strikes a boulder or the like.

It may readily be understood from the preceding explanation that the operator is enabled to move the plow blade up and down as desired. The operator may lock the plow blade in place as for making a cut, or may permit the blade to seek its own level as for making a fill or leveling off a roadway or the like.

It is apparent that the entire load of the plow and the plow supporting and plow actuating mechanisms is carried on the sub-frames of the tractor. In this way undue loading of the springs, by which the tractor is supported on the sub-frames, is entirely avoided. Furthermore, the reactive forces of the jacks are also carried to the sub-frames and do not tend to disturb the equilibrium of the tractor.

The plow blade and plow blade supporting structures so far described are adapted only for "bulldozing" or like operations where the plow blade or scraper is located at right angles to the longitudinal axis of the tractor. As has been previously stated it is sometimes desirable that means be provided so that the plow blade may be pivoted about a vertical axis to throw dirt to the right or the left or straight ahead as desired, may be tilted about its longitudinal axis to roll the dirt or other material to a greater or less degree, or about a transverse axis to make the blade cut deeper at one end than at the other, or various combinations of these positions. In Figures 7, 9, and 10 I have illustrated a structure which may be adjusted to these various positions. The actuating mechanism, actuating mechanism supports, and rear portions of the side frames are substantially the same.

In the structures shown in Figures 7, 9, and 10 I preferably employ angle or corner brackets 141 and 141a corresponding substantially in function to the brackets 44 previously described. These brackets 141 and 141a are mounted on the front ends of tubular members 142 and 142a, corresponding to the tubular members 74. The brackets 141 and 141a have openings 143 and 143a in the front faces thereof in order that telescoping push poles 144 and 144a may be slidingly engaged within the members 142 and 142a and may project forwardly therefrom to permit attachment thereof to the plow or scraper blade 146 as hereinafter described.

In this "trailbuilding" structure I preferably connect the brackets 141 and 141a by means of tubular beams 147 and 147a and a nose bracket 148. The beams 147 and 147a are received in suitable sockets in brackets 141 and 141a and nose 148 and since the members 147 and 147a are disposed at an angle greater than 90° with respect to the members 142 and 142a the structure may be referred to as an A frame, the nose 148 being located beyond the horizontal plane passing through brackets 141 and 141a. A heavy bolt 151 passes through the nose 148 and the bolt is provided with a forwardly projecting ear 152, which in turn is adapted to engage the ears 153 of a swivel bracket 154 located on the rear face of the blade 146. The bolt 151 is provided with a heavy nut 156 and a washer 157 to engage the rear face of the nose 148. A structure substantially like the present structure is more particularly described in Patent No. 2,059,431 to Wendell D. Barrett and Edward R. Greer. It is apparent that the plow blade may tilt about a transverse axis, that is with one side lower than the other, through the agency of the bolt 151, and that it may also be swung with one side or the other to the rear to throw material to the right or left as desired, by pivoting it about on the pin 155.

It is very desirable, in order to meet the heavy forces acting against the blade, that the blade be engaged to the A frame structure at both ends of the blade. A means for securing this result is shown in Figures 7, 9, and 10. The rearmost portion of the blade 146 is secured to the A frame by means of rearwardly projecting plates or ears 161 which are received in a pair of clevis-like ears or blade locks 162 on bracket 141. A pin 163 passes through the ears 161 and 162 to secure the ears in position. Like cooperating ears 161a and 162a are provided on the other end of the blade 146 and on the bracket 141a, respectively, and when the blade is positioned with the other end to the rear, which we may term the opposite "trailbuilding" position, the other end of the blade is secured to the bracket 141a by a pin similar to the pin 163, which passes through the respective ears 161a and 162a.

The forward end of the blade is held in position and braced by means of the extended portion 144a of the push pole. The forward portion of the push pole 144a, which may be termed a sleeve, is adapted, as has been previously explained, to be telescopically received in the cylindrical side frame member 142a and when it is not in use it is located entirely within the member 142a. When it is in use as a push pole it is withdrawn from the member 142a and a hook 164a, on the inner end of the sleeve, is engaged within the tube 142a by a pin 166 which passes downwardly through the brackets 141a. The front end of the sleeve 144a is connected to the blade 146 by means of a pin 167 which passes through the side wall of the end plate 168a and through a suitable clevis member 169a located within the front end of the sleeve 144a. The pin 167 is received within a suitable socket 171 in a bracket 172a on the rear end of the blade and the front end of the clevis member 169 bears against the rear wall of the bracket 172a to assist in carrying the load imposed on the push pole at this point. A similar structure including parts 141, 144, 164, 166, 169, and 172 is provided for the other end of the blade.

The blade ends 168 and 168a are so disposed, when in the advanced position, as to present a flat face extending vertically over the end of the blade and approximately parallel to the longitudinal axis of the earth moving device, and the sleeves 144 and 144a are preferably provided with means for receiving a removable plate 173, which plate also extends in a vertical plane at the outside of the sleeve 144a and parallel to the longitudinal axis of the earth moving device. These two plates cooperate to bear against the earth left by the blade as it moves forward to prevent the earth moving device from being turned sideways by the transversely acting component of the thrust set up on the blade as it moves material ahead of it. The blade ends 168 and 168a are preferably "toed in" at approximately 3° to assist in preventing the tractor from turning. This structure is a modification of a structure more particularly described in Patent No. 2,011,191 to Roy E. Choate and Waldo E. Rodler, and the structure as a whole is termed a land side or land slide.

It is sometimes desirable that the blade shown in the modification illustrated in Figure 9 be positioned in a "bulldozing" position, that is, at right angles to the longitudinal axis of the device. In this case the sleeves 144 and 144a are connected to the blade lock ears 161 and 161a, as shown in dotted lines in Figure 9, and pins 166 passed downwardly through suitable openings 174 in sleeves 144 and 144a. The clevis brackets 169 and 169a, at the front ends of the sleeves 144 and 144a, are preferably vertically elongated to provide openings 176 and 178 therethrough and the ear brackets 161 and 161a are likewise vertically elongated and provided with a plurality of openings 177 therethrough in order that when the blade is tilted to one side or the other, that is with one side lower than the other, it may be held in place by pins passed through corresponding openings 176 and 177. Some of the openings, such as those indicated at 177a, are elongated to permit securing the blade in extreme positions of tilt. In this way the blade may be tilted about a transverse axis and the sleeves 144 and 144a will hold it in the tilted position through the agency of the pins passed through openings 176 and 177.

In the "trailbuilding" positions of the blade, illustrated in Figure 9, the blade may also be tilted as desired by pinning the blade locks 162 and 162a to any desired openings in the ear 161 or 161a, depending, of course, on which end of the blade is to the rear. The forward end of the blade is braced by means of the push pole or sleeve 144 or 144a which is secured to the forward end of either of the side frame members 142 or 142a and corner brackets 143 or 143a by hooks 164 or 164a and pin 166, and at the forward end by pinning one of the clevises 169 or 169a to one of the sockets afforded by brackets 172 or 172a. The push poles may be tilted as desired in their engagement with the corner brackets 141 or 141a to suit any desired position of tilt of the blade while in the "trailbuilding" position.

It is apparent that numerous embodiments of my invention may be made by those skilled in the art. Two of these modifications have been illustrated in Figures 12 and 13. In the embodiment of the invention shown in Figure 12 the same plow and plow supporting mechanisms and structures have been employed. The supporting plates or support crank levers 201 are of substantially the same form and construction as the supporting plates or levers 84 previously described except that the boss 202 on the outer face of the outer support lever is placed lower down on the lever and the upper edge of the lever has been cut away to the concaved form shown. Another boss 203 is provided at the upper end of the lever or crank 201 and a similar boss is provided at the upper end of the inner lever 201a. The hydraulic jack 204 is provided with a cylindrical saddle 206 and this saddle is provided with trunnions 207 which are adapted to be received in suitable openings in the bosses 203 and 203a of cranks 201 and 201a. An actuating lever or bell crank 211 is provided and this bell crank is pivotally attached to the plate 201 by means of a stub shaft 212 journaled in the plate 201 and boss 202. A rearwardly extending lever arm 211a of the bell crank 211 is provided with a clevis-like portion 213 formed by providing a cranked extension 214 on the inner wall of the lever arm and joining the lever arm and the extension by means of a short shaft 216. The shaft 217 of the hydraulic jack 204 is provided with a fitting 218 adapted to engage the end of the shaft 217 and the cross shaft 216 of crank 211.

A forwardly extending portion 211b of the bell crank 211 is provided at its end with an opening therethrough adapted to receive a pin 221 on which a clevis 222, similar to the clevis 117 previously described in connection with the structure shown in Figures 1, 2, and 3, is engaged. The spring link 223 is similar to the spring link previously described except that it is shortened. The lower end of the spring link is connected to a side frame bracket 225 in the same manner as the previous construction. Of course the supporting and actuating mechanism here described is duplicated on the other side of the tractor.

In operation of the device shown in Figure 12 when fluid is introduced into the forward end of the hydraulic jack 204 the piston rod 217 is forced outwardly to raise the front lever arm 211b of bell crank 211 to raise the plow blade 224. When fluid is admitted to the rear end of the hydraulic jack 204 the piston rod 217 is drawn in to lower the plow blade 224. It is apparent that this structure is lighter than the structure previously described. This structure is preferably used in connection with smaller earth moving devices.

Another embodiment of my invention is illustrated in Figure 13. In this device also the same plow supporting mechanism is employed. The support plates or support cranks 251 are of different shape than those previously employed but they are secured to the sub-frames of the tractor in substantially the same manner as before. In this device the hydraulic jack is mounted on pairs of support plates 251 at the extreme upper end thereof, with the jack in a vertical position and with the piston rod 253 of the jack depending below the jack. The jack 252 is provided with a cylindrical saddle 254, similar to the saddle 206 previously described, and this saddle is provided with trunnions 256 which are adapted to be received in the plates 251 and bosses 257 in the upper ends of these plates. An actuating bell crank 258 is employed which is somewhat similar to the bell crank 211 previously described. The short rearwardly extending arm 258a of the bell crank 258 is pivotally engaged to a suitable connecting member 259 on the end of the piston rod 253 by means of a pin 261.

The forwardly extending portion 258b of the bell crank 258 is pivotally engaged to an ear 262 on the upper edge of the scraper blade 263 by means of a pin 264. An intermediate portion of the bell crank 258 is pivotally engaged on the inside of the plate 251 by means of a pin 266 and a slot 267 in the bell crank. The pin 266 is provided with a roller 268 so that the bell crank 258 may move back and forth to a limited extent to compensate for the arc taken by the plow blade 263 as it moves up and down about the stub shaft 271. The supporting and actuating structure is duplicated on the other side of the tractor.

It is apparent that when fluid is introduced into the upper end of the jack 252 the arm 258a of bell crank 258 will be forced downwardly to thus raise the arm 258b and thus raise the plow blade 263. When fluid is introduced into the lower portion of the hydraulic pack 252 the arm 258a will be raised and the arm 258b lowered to lower the plow blade 263.

From the foregoing it is apparent that my invention is susceptible to numerous variations and modifications. Such modifications may be made without departing from the spirit and scope of my invention as set forth by the appended claims.

I claim as my invention:

1. In an earth moving device including a tractor having sub-frames one on either side thereof, a plow blade, means for pivotally engaging the plow blade with the sub-frames, support means engaged to the sub-frames and projecting one on each side of each running gear, cradle means for spacing apart the support means, the said cradle means being pivotally mounted in the support means, and a hydraulic ram engaged to the cradle, and means for operatively connecting the shaft of the ram to the plow blade.

2. In an earth moving device of the class described, a tractor having sub-frames having fixed and longitudinally movable portions on which the running gears are mounted, covers for the sub-frames, side frames adapted to be pivotally engaged to the sub-frames, a plow blade mounted on the side frames at the front ends thereof, supports engaged to the movable portions of the sub-frames and having torque arms extending adjacent the fixed portions of the sub-frames, and plates having stub shafts for pivotally engaging the side frames, and the plates having means thereon for operatively engaging the torque arms of the support means, the plates being adapted to engage both the sub-frames and the covers.

3. In an earth moving device including a tractor, sub-frames for supporting the tractor and running gears mounted on the sub-frames, a plow blade, means for pivotally engaging the plow blade to the sub-frames, means for actuating the plow blade including plates projecting upwardly on either side of each of the running gears and attached to the sub-frames, bell cranks, and hydraulic jacks for operating the bell cranks disposed between the pairs of plates.

4. In an earth moving device, a tractor, sub-frames pivotally engaged to the tractor having fixed and movable portions, a plow blade pivotally engaged to the sub-frames, means for supporting and actuating the plow blade including supporting means engaged to the movable portions of the sub-frames and having rearwardly extending torque arms, and means on the fixed portions of the sub-frames for engaging the torque arms, said means including a link pivotally engaged to the fixed portions and pivotally engaged to the torque arms.

5. An earth moving device comprising a tractor having a main frame and a truck frame on each side thereof, spaced plates mounted on each side of a truck frame, an earth moving means extended in front of said tractor, means for supporting said earth moving means for hinged movement relative to said tractor, a power means mounted between said plates, a bell crank hinged between said plates, means connecting one arm of said crank to said power means, and means joining the other arm of said crank to said supporting means.

6. An earth moving device comprising a tractor having a main frame and a truck frame on each side thereof, spaced plates mounted on each side of a truck frame, an earth moving means extended in front of said tractor, means for supporting said earth moving means for hinged movement relative to said tractor, a hydraulic cylinder mounted in trunnions between said plates and including a piston rod, a bell crank hinged between said plates, means connecting one arm of said crank to said piston rod, and means joining the other arm of said crank to said supporting means.

7. In an earth moving device including a tractor, sub-frames for the tractor, a plow blade pivotally connected to the sub-frames, and an actuating mechanism positioned above each of the sub-frames, said actuating mechanism including a bell crank and a hydraulic jack, and means for supporting each of the actuating mechanisms from the sub-frames including spaced plate-like members and the actuating mechanism being pivotally mounted between the spaced plate-like members.

8. In an earth moving device including a tractor, sub-frames for supporting the tractor and running gears mounted on the sub-frames, an earth moving means including means for pivotally attaching the earth moving means to the sub-frames, means for actuating the earth moving means including pairs of plates supported by the sub-frames, bell cranks pivotally engaged between each pair of plates, hydraulic jacks for operating the bell cranks also pivotally engaged between each pair of plates, and links for connecting the free arms of the bell cranks to the earth moving means.

9. In an earth moving device comprising a tractor having a main frame and a track frame on each side thereof, spaced plates supported by each track frame, an earth moving means extended in front of said tractor, means for supporting said earth moving means for hinged movement relative to said tractor, the said plates being formed and modified to constitute plates extending upwardly above the track frames in spaced relation, a jack disposed between the upwardly extending plates and pivotally engaged in bearings supported by the upwardly extending plates, a bell crank also pivotally engaged in bearings supported by the plates, the ram of the jack being pivotally engaged to one arm of the bell crank, and a link connection between the earth moving means and the other arm of the bell crank.

10. In an earth moving device including a tractor having sub-frames and running gears mounted on the sub-frames, a plow blade, means for pivotally engaging the plow blade to the sub-frames, means for actuating the plow blade including plates projecting upwardly on either side of the running gears and attached to the sub-frames, and plow actuating means pivotally mounted between the plates.

11. An earth moving device comprising a tractor having a main frame and a track frame on each side thereof, a pair of plates mounted on each track frame, an earth moving means extended in front of said tractor, means for supporting said earth moving means for hinged movement relative to said tractor, a power means mounted between said plates, a bell crank hinged between said plates, means connecting one arm of said crank to said power means, and means joining the other arm of said crank to said supporting means.

12. In an earth moving device including a tractor, sub-frames for supporting the tractor, running gears mounted on the sub-frames, earth moving means including means for connecting the earth moving means to the sub-frames, means for actuating the earth moving means including pairs of plates supported by and projecting upwardly above each of the running gears, a bell crank and a hydraulic jack pivotally supported between respective pairs of plates, means to pivotally connect each crank to an adjacent jack, and means for connecting the free ends of the bell cranks with the earth moving means.

ELLSWORTH W. AUSTIN.